United States Patent
Sasaki

(10) Patent No.: US 10,410,329 B2
(45) Date of Patent: Sep. 10, 2019

(54) IMAGE PROCESSING APPARATUS, IMAGE PROCESSING METHOD, AND COMPUTER READABLE STORAGE MEDIUM

(71) Applicant: CANON KABUSHIKI KAISHA, Tokyo (JP)

(72) Inventor: Takashi Sasaki, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 100 days.

(21) Appl. No.: 15/658,525

(22) Filed: Jul. 25, 2017

(65) Prior Publication Data

US 2018/0033127 A1  Feb. 1, 2018

(30) Foreign Application Priority Data

Jul. 29, 2016  (JP) .................. 2016-150265

(51) Int. Cl.
- *G06K 9/00* (2006.01)
- *G06T 5/20* (2006.01)
- *G06K 9/46* (2006.01)
- *G06T 5/00* (2006.01)

(52) U.S. Cl.
CPC .............. *G06T 5/20* (2013.01); *G06K 9/4604* (2013.01); *G06K 9/4609* (2013.01); *G06T 5/001* (2013.01); *G06T 2207/10028* (2013.01); *G06T 2207/20028* (2013.01); *G06T 2207/20032* (2013.01)

(58) Field of Classification Search
CPC . G06T 2207/10021; G06T 2207/10028; G06T 7/593; G06T 2207/10012; G06T 2207/20228; G06T 7/50; H04N 13/122; H04N 13/128; H04N 2013/0081; H04N 13/271

See application file for complete search history.

(56) References Cited

U.S. PATENT DOCUMENTS

| | | | |
|---|---|---|---|
| 7,889,949 B2 | 2/2011 | Cohen et al. | |
| 2014/0063188 A1* | 3/2014 | Smirnov | G06T 7/593 348/43 |
| 2015/0117757 A1* | 4/2015 | Drazic | H04N 13/122 382/154 |

(Continued)

FOREIGN PATENT DOCUMENTS

| | | |
|---|---|---|
| JP | 01-167610 A | 7/1989 |
| JP | 2006-039666 A | 2/2006 |
| JP | 2008-015754 A | 1/2008 |

(Continued)

*Primary Examiner* — Li Liu
(74) *Attorney, Agent, or Firm* — Cowan, Liebowitz & Latman, P.C.

(57) ABSTRACT

An image processing apparatus has an acquisition unit adapted to acquire an image signal and an evaluation value signal corresponding to the image signal as a pair of signals; and a filter processing unit adapted to apply a filtering process to the pair of signals, wherein the filter processing unit applies a first filtering process to the image signal and applies a second filtering process to the evaluation value signal, in the first filtering process, refers to a first reference pixel to determine a pixel value of a first target pixel, and in the second filtering process, determines a pixel value of a second target pixel corresponding to the first target pixel based on a pixel value of a second reference pixel at a coordinate position corresponding to a coordinate position of the first reference pixel.

14 Claims, 11 Drawing Sheets

(56) References Cited

U.S. PATENT DOCUMENTS

2015/0178936 A1* 6/2015 Boisson ............... H04N 13/271
                                                    382/154
2018/0309974 A1* 10/2018 Varekamp ............ H04N 13/128

FOREIGN PATENT DOCUMENTS

| JP | 2015-536057 A | 12/2015 |
| JP | 2016-017799 A | 2/2016 |

* cited by examiner

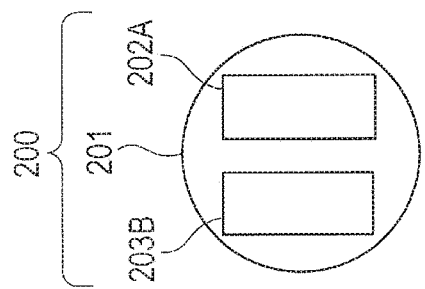
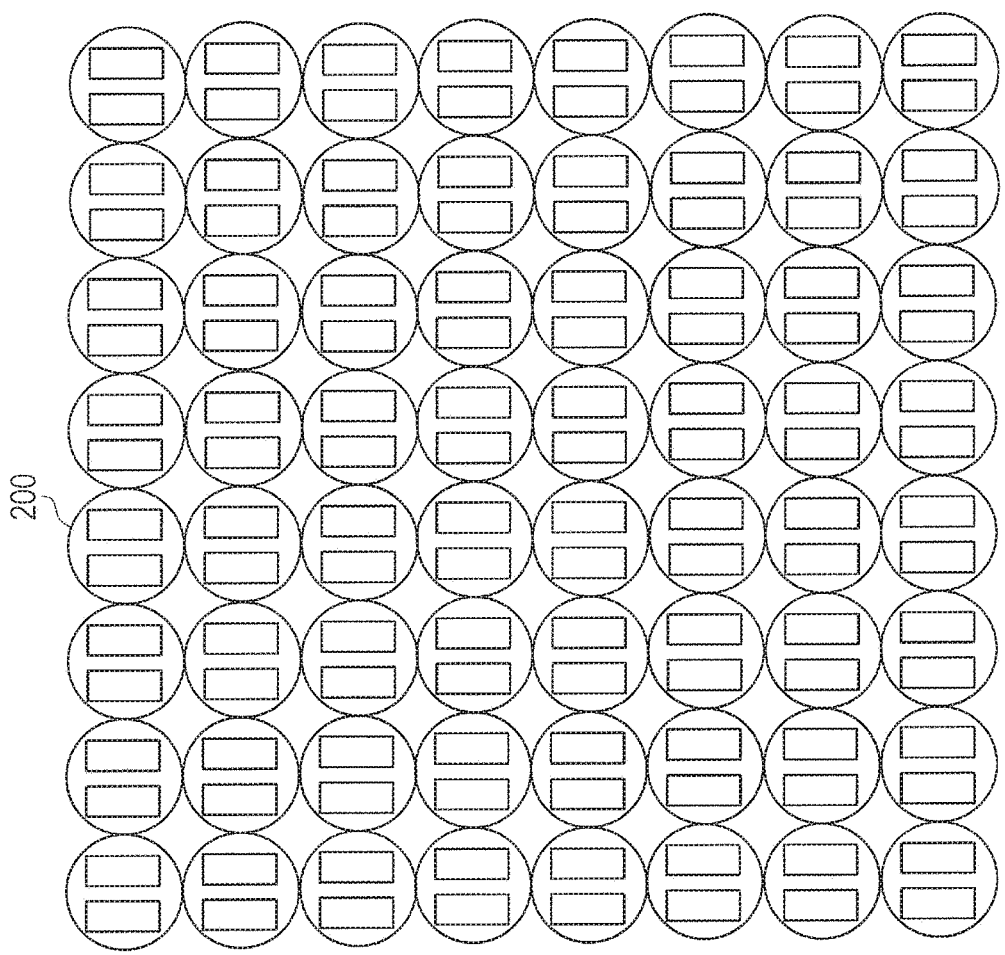
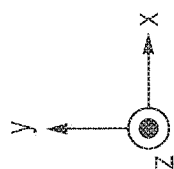

FIG. 5
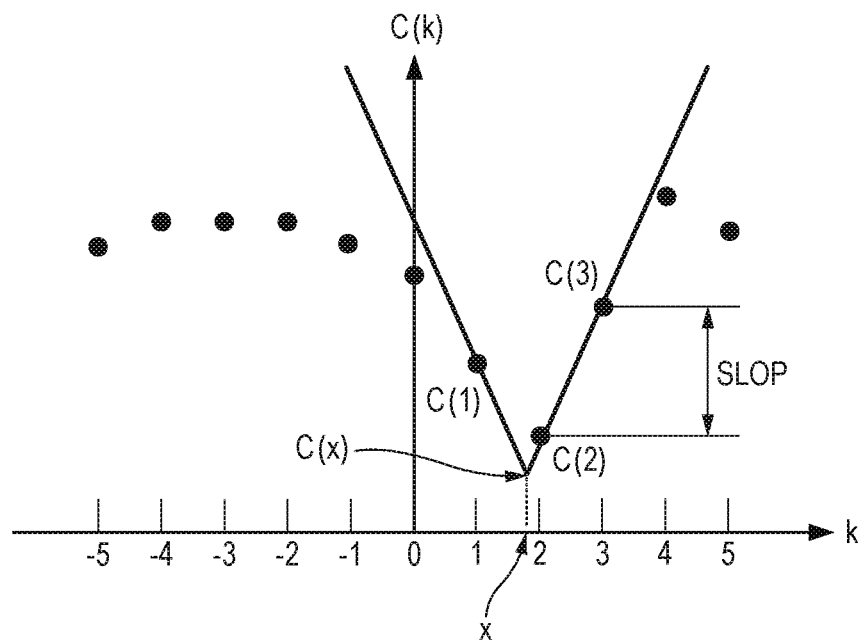
FIG. 6A
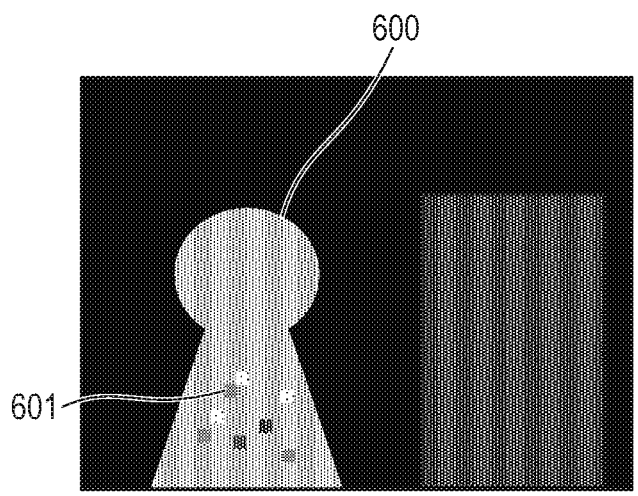
FIG. 6B

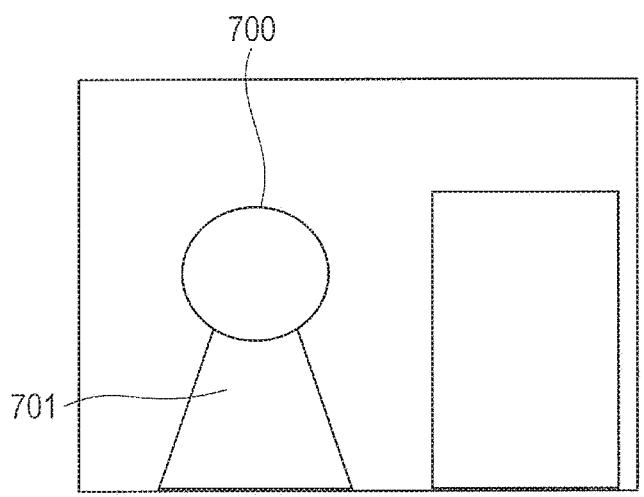

FIG. 8A

| 236 | 235 | 228 |
|-----|-----|-----|
| 255 | 230 | 220 |
| 250 | 255 | 255 |

FIG. 8B

| 104 | 103 | 120 |
|-----|-----|-----|
| 102 | 90  | 99  |
| 99  | 100 | 101 |

FIG. 8C

| 236 | 228 | 235 |
|-----|-----|-----|
| 255 | 220 | 230 |
| 250 | 255 | 255 |

FIG. 8D

| 104 | 120 | 103 |
|-----|-----|-----|
| 102 | 99  | 90  |
| 99  | 100 | 101 |

FIG. 8E

| 190 | 200 | 228 |
|-----|-----|-----|
| 136 | 219 | 220 |
| 208 | 197 | 75  |

FIG. 8F

| 104 | 103 | 120 |
|-----|-----|-----|
| 102 | 90  | 99  |
| 99  | 100 | 101 |

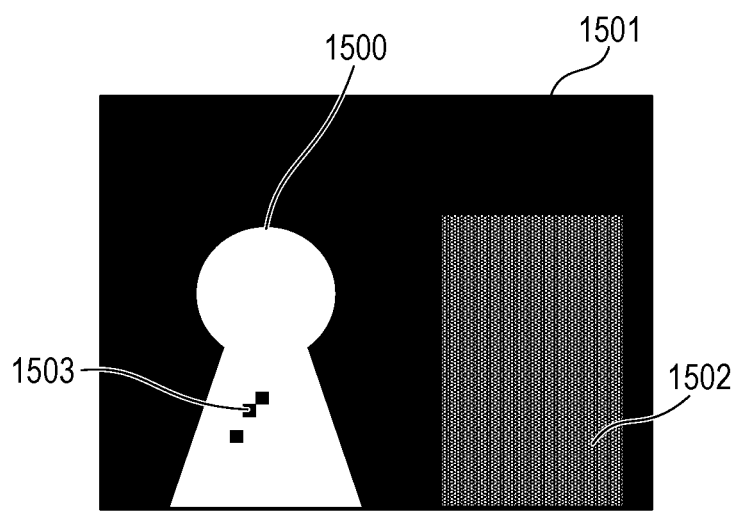

IMAGE PROCESSING APPARATUS, IMAGE PROCESSING METHOD, AND COMPUTER READABLE STORAGE MEDIUM

BACKGROUND OF THE INVENTION

Field of the Invention

The present invention relates to an image processing apparatus, an image processing method, and a computer readable storage medium that apply a filtering process to a pair of signals.

Description of the Related Art

Conventionally, in a field of computer vision or the like, it is demanded to obtain robust distance information from a captured image (see Japanese Patent Application Laid-Open No. 2015-536057). Further, as the related arts, technologies disclosed in Japanese Patent Application Laid-Open No. 2008-15754, U.S. Pat. No. 7,889,949, Japanese Patent Application Laid-Open No. H01-167610, Japanese Patent Application Laid-Open No. 2016-17799, and Japanese Patent Application Laid-Open. No. 2006-39666 are known.

The Japanese Patent Application Laid-Open. No. 2015-536057 discloses an art of obtaining a robust parallax distribution. In the art disclosed in Japanese Patent Application Laid-Open No. 2015-536057, a parallax map and a reliability map corresponding thereto are acquired based on a right image and a left image. Furthermore, an outlier of parallax estimation is removed, and a parallax distribution is then estimated by applying a spatial filtering to a parallax map and a reliability map.

In the art disclosed in Japanese Patent Application Laid-Open No. 2015-536057 described above, however, there is a problem that application of a nonlinear spatial filter such as a median filter may impair the correlation between a parallax map and a reliability map.

SUMMARY OF THE INVENTION

The present invention has been made view of the problem discussed above and intends to provide an image processing apparatus, an image processing method, and a computer readable storage medium that can apply a filtering process without impairing the correlation between a pair of signals when applying the filtering process thereto.

According to one aspect of the present invention, provided is an image processing apparatus having: an acquisition unit adapted to acquire an image signal and an evaluation value signal corresponding to the image signal as a pair of signals; and a filter processing unit adapted to apply a filtering process to the pair of signals, wherein the filter processing unit applies a first filtering process to the image signal and applies a second filtering process to the evaluation value signal, in the first filtering process, refers to a first reference pixel to determine a pixel value of a first target pixel, and in the second filtering process, determines a pixel value of a second target pixel corresponding to the first target pixel based on a pixel value of a second reference pixel at a coordinate position corresponding to a coordinate position of the first reference pixel.

According to another aspect of the present invention, provided is an image processing method having steps of: acquiring an image signal and an evaluation value signal corresponding to the image signal as a pair of signals; and applying a filtering process to the pair of signals, wherein the step of applying the filter processing applies a first filtering process to the image signal and applies a second filtering process to the evaluation value signal, in the first filtering process, refers to a first reference pixel to determine a pixel value of a first target pixel, and in the second filtering process, determines a pixel value of a second target pixel corresponding to the first target pixel based on a pixel value of a second reference pixel at a coordinate position corresponding to coordinate position of the first reference pixel.

According to the present invention, in application of a filtering process to a pair of signals, the filtering process can be applied without impairing the correlation of the pair of signals.

Further features of the present invention will become apparent from the following description of exemplary embodiments with reference to the attached drawings.

BRIEF DESCRIPTION OF THE DRAWINGS

FIG. 2A and FIG. 2B are diagrams illustrating an imaging unit of the image processing apparatus according to the first embodiment of the present invention.

FIG. 5 is a diagram illustrating calculation of a shift amount for deriving a defocus amount.

FIG. 6A and FIG. 6B are diagrams illustrating a defocus map.

FIG. 7A and FIG. 7B are diagrams illustrating a reliability map.

FIG. 8A, FIG. 8B, FIG. 8C, FIG. 8D, FIG. 8E and FIG. 8F are diagrams illustrating a filtering process taking the reliability of pixels into consideration in the image processing apparatus according to the first embodiment of the present invention.

FIG. 15A and FIG. 15B are diagrams illustrating a region extraction map.

FIG. 16A, FIG. 16B and FIG. 16C are diagrams illustrating a case where application of a nonlinear spatial filter impairs the correlation between a parallax map and a reliability map.

DESCRIPTION OF THE EMBODIMENTS

Figure 1:
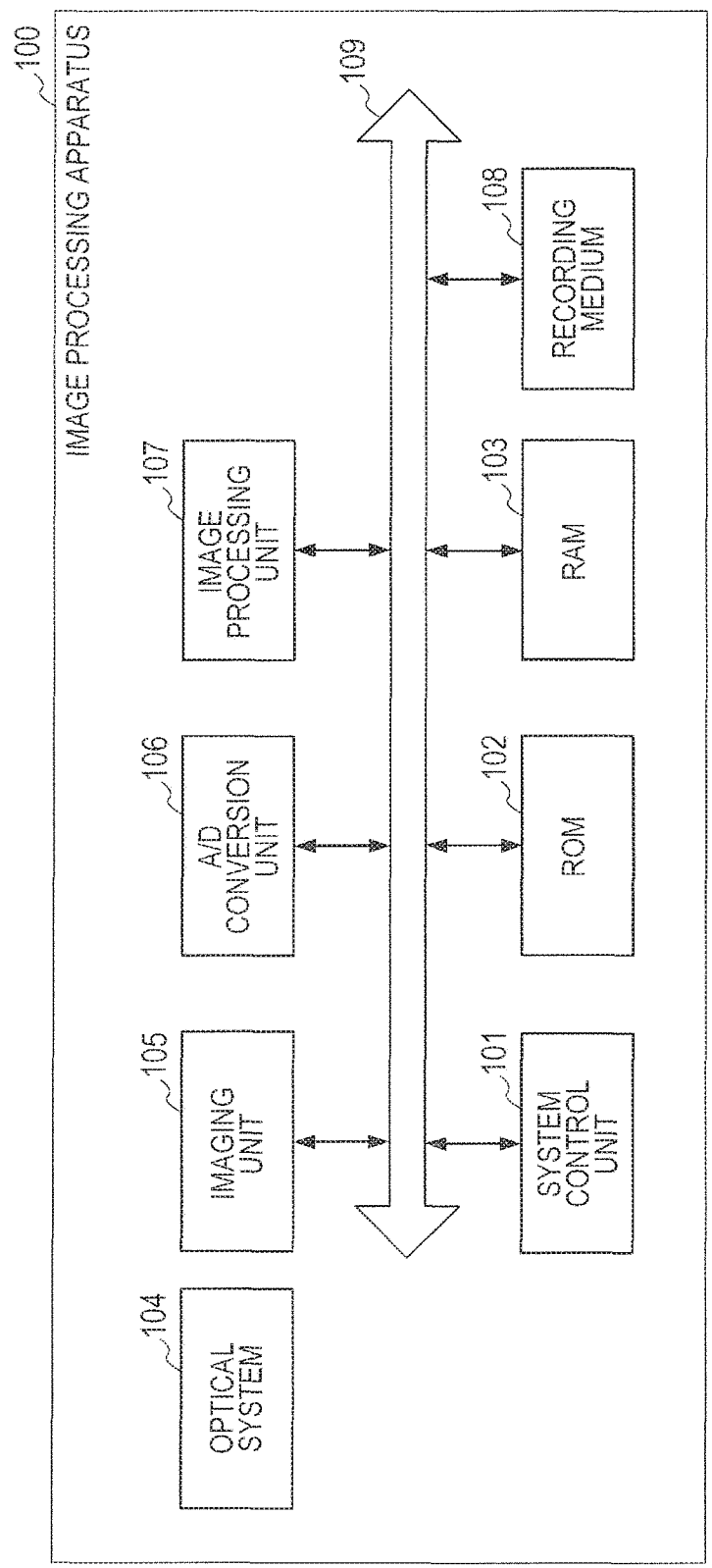
FIG. 1 is a block diagram illustrating a functional configuration of an image processing apparatus according to a first embodiment of the present invention.

Preferred embodiments of the present invention will now be described in detail in accordance with the accompanying drawings.

As discussed above, in the art disclosed in Japanese Patent Application Laid-Open No. 2015-536057, there is a problem that application of a nonlinear spatial filter may impair the correlation between a parallax map and a reliability map. How the correlation between both the maps is impaired by the application of a nonlinear spatial filter will be specifically described below by using FIG. 16A to FIG. 16C.

FIG. 16A to FIG. 16C are diagrams illustrating a case of applying a median filter to a parallax map and a reliability map in a region of three by three pixels. FIG. 16A is a diagram illustrating coordinate positions of three by three pixels. A coordinate position of a pixel is denoted as (m, n). A pixel at (m, n)=(0, 0) is a target pixel of a filter, and nine pixels including a target pixel are reference pixels of the filter. FIG. 16B is a diagram representing parallax values of parallax map information by using eight-bit pixel values. FIG. 16C is a diagram representing reliability values of reliability map information corresponding to a parallax map by using eight-bit pixel values in a similar manner.

When a median filter is applied to the region of FIG. 16B, the parallax value of the target pixel changes from 90 to 101. When describing with representation of FIG. 16A, the parallax value of the pixel at (m, n)=(1, 1) is output as a value of the target pixel at (m, n)=(0, 0).

On the other hand, as described in Japanese Patent Application Laid-Open No. 2015-536057, the median filter is applied also to the reliability map. When the median filter is applied to the region of FIG. 16C, the reliability value of the target pixel changes from 230 to 236. When describing with representation of FIG. 16A, the reliability value of the pixel at (m, n)=(−1, −1) is output as a value of the target pixel at (m, n)=(0, 0).

It is here assumed that a threshold of the reliability is 250, for example, and a parallax value having a reliability higher than or equal to the threshold is set to a high reliability. In the above case, when the median filter is applied to the parallax map, the parallax value of the pixel at (m, n)=(1, 1) whose reliability value is 255, which is a high reliability, is output as a value of the target pixel. As a result of application of the median filter also to the reliability map, however, not the reliability value of the pixel at (m, n)=(1, 1) but the reliability value of the pixel at (m, n)=(−1, −1) is output as the reliability of the target pixel. As a result, the parallax value of the target pixel would be less reliable.

As discussed above, in the art disclosed in the Japanese Patent Application Laid-Open No. 2015-536057, the correlation between a parallax map and a reliability map will be impaired.

In contrast, when applying a filter to a pair of signals of an image signal and an evaluation value signal corresponding thereto, an image processing apparatus and an image processing method according to the embodiments of the present invention can apply a filter without impairing the mutual correlation. The embodiments of the present invention will be described in detail below with reference to the drawings. Note that the present invention is not limited to the following embodiments and can be modified as appropriate within the scope not departing from its spirit. Further, in the drawings illustrated below, those having the same function are labeled with the same reference numerals, and the description thereof may be omitted or simplified.

First Embodiment

The image processing apparatus and the image processing method according to the first embodiment of the present invention will be described by using FIG. 1 to FIG. 8F. Note that, in the present embodiment described below, a case where the image processing apparatus has an imaging unit, that is, a case where the image processing apparatus is an imaging apparatus such as a digital camera will be described as an example.

In the present embodiment, a defocus map and a reliability map representing the reliability thereof as information associated with the distance distribution of an object are acquired. Then, when applying a filtering process including a median filter, which is a nonlinear spatial filter, to the defocus map and the reliability map, the filtering process is performed by referring to pixels present at corresponding coordinate positions in the defocus map and the reliability map. This allows for obtaining a defocus map and a reliability map having a high robustness without impairing the mutual correlation.

FIG. 1 is a block diagram illustrating a functional configuration of an image processing apparatus according to the present embodiment. As illustrated in FIG. 1, an image processing apparatus 100 according to the present embodiment has a system control unit 101, a read only memory (ROM) 102, and a random access memory (RAM) 103. Further, the image processing apparatus 100 according to the present embodiment has an optical system 104, an imaging unit 105, an analog-to-digital (A/D) conversion unit 106, an image processing unit 107, a recording medium 108, and a bus 109. The system control unit 101, the ROM 102, the RAM 103, the imaging unit 105, the A/D conversion unit 106, the image processing unit 107, and the recording medium 108 are connected to the bus 109, respectively.

The system control unit 101 controls the entire image processing apparatus 100 and is a central processing unit (CPU), for example. The system control unit 101 reads out operation programs for respective blocks of the image processing apparatus 100 from the ROM 102 and loads and executes it in the RAM 103 to control the operation of respective blocks of the image processing apparatus 100.

The ROM 102 is a rewritable non-volatile memory, and a flash ROM or the like is used, for example. The ROM 102 stores parameters or the like that is necessary to operation of respective blocks in addition to the operation programs of respective blocks of the image processing apparatus 100. Further, the ROM 102 also stores an exit pupil distance as lens information that is necessary for focus detection or the like.

The RAM 103 is a rewritable volatile memory and is used for a temporal storage area for data output in operation of respective blocks of the image processing apparatus 100. The system control unit 101 and the image processing unit 107 use the RAM 103 as a work memory.

The optical system 104 captures an object image on the imaging unit 105. The optical system 104 includes a fixed lens, a magnification lens that changes a focus distance, a focus lens that performs focus adjustment, or the like, for example. The optical system 104 further includes a diaphragm and performs light amount adjustment at capturing by adjusting the aperture of the optical system by using the diaphragm.

The imaging unit 105 is an imaging device such as a charge-coupled device (CCD) image sensor or a complementary metal oxide semiconductor (CMOS) image sensor, for example. The imaging unit 105 photoelectrically converts an optical image captured on the imaging device by the optical system 104 to obtain an analog image signal. The imaging unit 105 outputs the obtained analog image signal to the A/D conversion unit 106.

The A/D conversion unit 106 applies an A/D conversion process to the input analog image signal to obtain digital image data. The A/D conversion unit 106 outputs the obtained digital image data to the RAM 103 for storage.

The image processing unit 107 performs image processing on image data stored in the RAM 103. Specifically, the image processing unit 107 performs various image processing such as a process of white balance adjustment, color interpolation, scaling, or the like, in addition, generation of a defocus map and a reliability map, a filtering process, or the like, for example. The image processing unit 107 records the image-processed image in the recording medium 108.

The recording medium 108 is a memory card or the like that is removable from the image processing apparatus 100, for example. An image stored in the RAM 103 processed by the image processing unit 107, an image A/D-converted by the A/D conversion unit 106, or the like is recorded as a record image in the recording medium 108.

The bus 109 connects respective blocks of the image processing apparatus 100 to each other. Each block performs transaction of signals via the bus 109.

FIG. 2A illustrates the alignment of a pixel of the imaging unit 105 of FIG. 1. As illustrated in FIG. 2A, a plurality of pixels 200 are two-dimensionally aligned in a regular manner in the imaging unit 105. Specifically, the plurality of pixels 200 are aligned in a two-dimensional matrix, for example. Note that the alignment of the pixels 200 is not limited to the matrix alignment, and other alignments may be employed.

FIG. 2B enlarges and illustrates one of the pixels 200 illustrated in FIG. 2A. As illustrated in FIG. 2B, each pixel 200 has a micro lens 201 and a pair of photoelectric conversion units 202A and 203B (hereafter, referred to as pupil division pixels 202A and 203B, respectively). The pupil division pixels 202A and 203B have the same planar shape as each other and each have a rectangular planar shape whose longitudinal direction is in the y-axis direction. In each pixel 200, the pupil division pixels 202A and 203B are arranged in a symmetrical manner with respect to a perpendicular bisector in the y-axis direction of the micro lens 201 as a symmetrical axis. Note that the planer shape of the pupil division pixels 202A and 203B not limited to the above, and other planar shapes may be employed. Further, the form of arrangement of the pupil division pixels 202A and 203B is not limited to the above, and other forms of arrangement may be employed.

In the present embodiment, from the pupil division pixels 202A and 203B two-dimensionally aligned in a regular manner, an A image and a B image are output as parallax images, respectively. The configuration of the imaging unit 105 as illustrated in FIG. 2A and FIG. 2B can cause a pair of light fluxes passing through different regions of the pupil of the optical system 104 to be captured as a pair of optical images and output the pair of optical images as the A image and the B image. The image processing unit 107 refers to the A image and the B image to generate a defocus map in a manner described later.

Note that the acquisition method of the A image and the B image is not limited to the above, and various methods can be employed. For example, the A image and the B image may be such images that are acquired by a plurality of imaging apparatuses such as cameras set with a spacing and have a parallax from each other. Further, the A image and the B image may be respective parallax images acquired by a single imaging apparatus such as a camera having a plurality of optical systems and imaging units.

Figure 3:
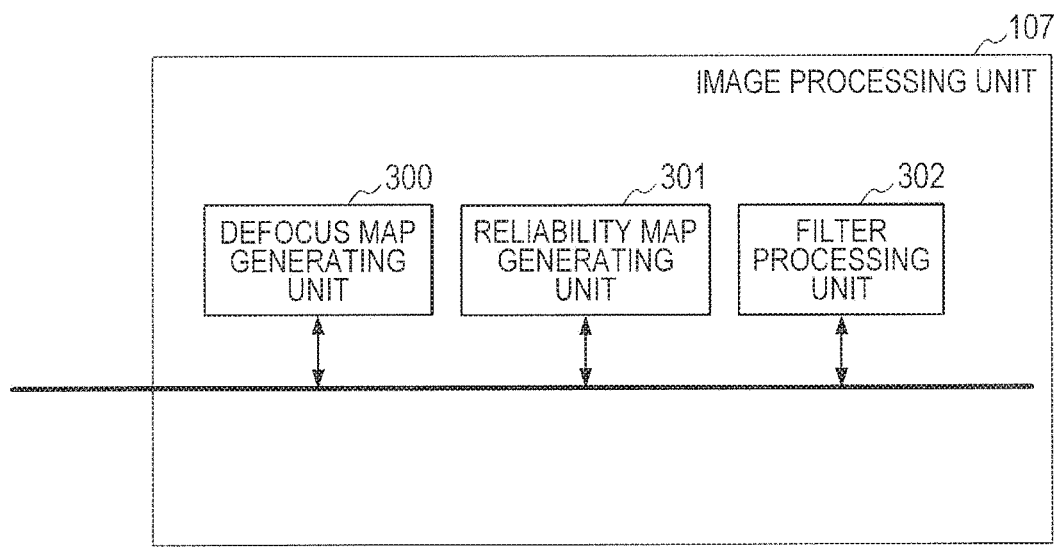
FIG. 3 block diagram illustrating a configuration of the image processing unit of the image processing apparatus according to the first embodiment of the present invention.

FIG. 3 is a block diagram illustrating an example of a specific configuration of the image processing unit 107 in the image processing apparatus 100 according to the present embodiment. As illustrated in FIG. 3, the image processing unit 107 has a defocus map generating unit 300, a reliability map generating unit 301, and a filter processing unit 302.

The defocus map generating unit 300 refers to the A image and the B image, which are a pair of parallax images described above, to calculate a defocus amount and generates a defocus map representing a spatial distribution of the calculated defocus amount.

The reliability map generating unit 301 derives a reliability that one of the evaluation values with respect to the defocus amount calculated by the defocus map generating unit 300 and generates a reliability map that represents a spatial distribution of the derived reliability. While a defocus map is an image signal indicating image information, a reliability map is an evaluation value signal indicating evaluation information on the defocus map. The reliability map has the same resolution as the defocus map, that is, the same gradation as the defocus map. Note that the reliability map may have a different resolution from the defocus map, that is, a different gradation from the defocus map, as described later. While the defocus map and the reliability map are different from each other in the dimension of what they indicate, these maps have a correlation with each other. Therefore, a defocus map, which is an image signal, and a reliability map, which is an evaluation value signal, form a pair of signals having a correlation with each other. In the present specification, both the maps are collectively referred to as "a pair of signals".

The defocus map generating unit 300 and the reliability map generating unit 301 function as an acquisition unit adapted to generate and acquire a defocus map and a reliability map as a pair of signals.

The filter processing unit 302 functions as a filter processing unit adapted to apply a filtering process to a defocus map and a reliability map that are a pair of signals. That is, the filter processing unit 302 applies a filtering process using a median filter to the defocus map. On the other hand, the filter processing unit 302 applies, to the reliability map, a filtering process for determining a pixel value of a target pixel by referring to a pixel at the same coordinate position as a reference pixel that has been referenced in the determination of the pixel value of the target pixel in the filtering process applied to the defocus map.

Figure 4:
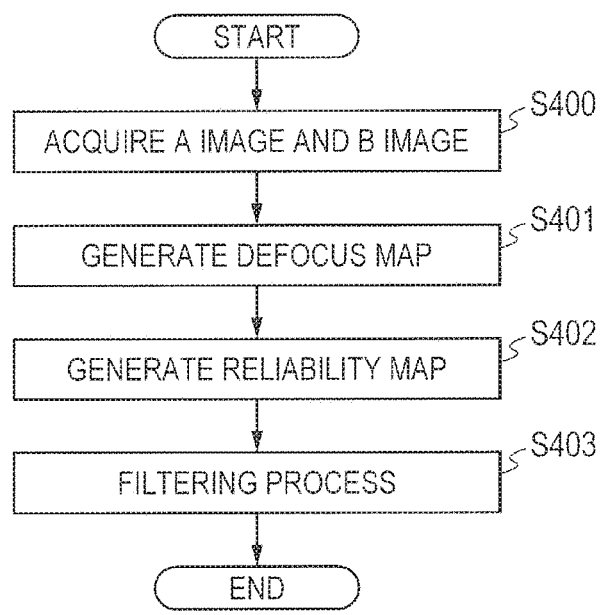
FIG. 4 is a flowchart illustrating operation of the image processing apparatus according to the first embodiment of the present invention.

Operation of the image processing apparatus 100 including processes performed by the image processing unit 107 will be described below by using FIG. 4. FIG. 4 is a flowchart illustrating the operation of the image processing apparatus 100 including processes performed by the image processing unit 107.

First, at step S400, an object is captured by the image processing apparatus 100 as an imaging apparatus. Thereby, the image processing unit 107 acquires an A image and a B image that are a pair of parallax images. Note that the A image and the B image may be prerecorded in the recording medium 108, and the image processing unit 107 may be configured to read out and acquire the prerecorded A image and B image.

Next, at step S401, the defocus map generating unit 300 uses the A image and the B image acquired at step S400 to calculate the defocus amount at the target pixel position as information associated with the distance distribution of the object. While the scheme for calculating the defocus amount from the A image and the B image is not limited in particular, a method disclosed in Japanese Patent Application Laid-Open No. 2008-15754 described below can be used, for example.

Data series of the A image in a fine block whose center is the target pixel position are expressed with generalization of E(1) to E(m), and data series of the B image are expressed with generalization of F(1) to F(m), where m denotes the number of data. In this case, a correlation amount C(k) for a shift amount k between the two data series is calculated by using equation (1) while shifting the data series F(1) to F(m) relative to the data series E(1) to E(m).

$$C(k)=\Sigma|E(n)-F(n+k)| \quad (1)$$

In equation (1), $\Sigma$ operation is calculated for n. In this $\Sigma$ operation, the ranges of n and n+k are limited to 1 to m. Further, the shift amount k is an integer and is a relative shift amount whose unit is a detection pitch of a pair of image data.

As an example of a calculation result of equation (1), FIG. 5 illustrates a graph in which the horizontal axis denotes the shift amount k and the vertical axis denotes the correlation amount C(k).

It can be seen from FIG. 5 that the correlation amount C(k) is the minimum at a shift amount k where the correlation of a pair of data series is high. A three-point interpolation scheme by using the following equations (2) to (5) is then used to calculate and derive a shift amount x which gives the minimum value C(x) to a continuous correlation amount.

$$x=kj+D/SLOP \quad (2)$$

$$C(x)=C(kj)-|D| \quad (3)$$

$$D=\{C(kj-1)-C(kj+1)\}/2 \quad (4)$$

$$SLOP=\text{MAX}\{C(kj+1)-C(kj),C(kj-1)-C(kj)\} \quad (5)$$

Here, kj is k at which the discrete correlation amount C(k) is the minimum. In the example illustrated in FIG. 5, kj is 2.

From the shift amount x derived by equation (2), the defocus amount DEF to a planned capturing plane of object image plane can be derived by the following equation (6).

$$DEF=KX \cdot PY \cdot x \quad (6)$$

In equation (6), PY denotes a detection pitch, and KX denotes a conversion coefficient determined by the opening angle of the centroid of light fluxes passing through a pair of pupils.

The defocus map generating unit 300 generates and outputs a defocus map representing a spatial distribution of the defocus amount calculated in such a way.

FIG. 6A illustrates an example of the generated defocus map. In the example illustrated in FIG. 6A, the defocus amount is represented by eight-bit gray scale, and the object located in front is represented whiter (with a higher pixel value).

It can be seen from FIG. 6A that unevenness occurs in the defocus amount within an object image 600 in front. FIG. 6B illustrates pixels of a target pixel 601 and eight neighboring peripheral pixels of the region with unevenness together with pixel values indicating the defocus amounts thereof.

The reason why unevenness occurs in a defocus map as illustrated in FIG. 6A and FIG. 6B will be described below.

The use of the three-point interpolation scheme described above allows for obtaining the shift amount x which provides the minimum value C(x) to a continuous correlation amount and the defocus amount. In this case, it can be appreciated that, even if the value of C(kj) were the same, a change in the relationship between C(kj−1) and C(kj−1) due to an effect of a change in the pattern of the object would cause a change in the obtained shift amount x and defocus amount. Thus, it is appreciated that, even when the target pixel is present within the same object and the value of C(kj) the same, a change in the relationship between C(kj+1) and C(kj−1) causes the defocus amount to vary and unevenness to occur in the defocus map.

Further, because the S/N ratio (signal to noise ratio) varies between pixels of an image sensor used as the imaging unit 105, the effect of variation occurring in the input signal also causes unevenness in the defocus map. Further, when a desired C(kj) cannot be calculated because of a low contrast of the object or when a smaller SLOP illustrated in FIG. 5 causes a larger variation of the defocus amount, unevenness occurs in the defocus map.

In contrast, in the present embodiment, a more robust defocus map with suppressed unevenness can be obtained by applying a filtering process as described later.

Next, at step S402, the reliability map generating unit 301 generates a reliability map for the defocus map generated by the defocus map generating unit 300.

A reliability is a value that indicates the degree of how easy the shift amount having a high correlation between the A image and the B image calculated at step S401 can be detected in the region. Since the defocus amount calculated in a region where it is difficult to detect a shift amount is likely to be inaccurate, a lower reliability is set. Specifically, the region where it is difficult to detect a shift amount is a region having little change in the pattern of the object such as sky or a body of an automobile, for example. A low reliability can be allocated to such a region after detection thereof. As an index for determining whether or not the change in the pattern is little, an edge integration value can be used. Specifically, when a correlation amount is calculated at step S401, an edge integration value is calculated by integrating the absolute values of the edge amplitude of the referenced data series. The reliability is then allocated such that a greater edge integration value results in a greater reliability. By repeating the above process on a target pixel basis, a reliability map can be generated for the defocus map. In such a way, in a reliability map, the reliability can be determined based on edge information for each region. The reliability of a defocus amount indicated in a pixel at a corresponding coordinate position in the defocus map is indicated in each pixel of the reliability map. Specifically, while both the corresponding coordinate positions are the same, they may be different coordinate positions associated in accordance with a predetermined association relationship.

FIG. 7A illustrates an example of the generated reliability map. In the example illustrated in FIG. 7A, the reliability is represented by eight-bit gray scale, and a higher reliability is represented whiter (with a higher pixel value).

The target pixel 701 illustrated in FIG. 7A is at the same coordinate position as the target pixel 601 illustrated in FIG. 6A. FIG. 7B illustrates pixels of a target pixel 701 and eight neighboring peripheral pixels thereof together with pixel values indicating the reliability thereof. It can be seen from FIG. 7A and FIG. 7B that, since the pattern of the object changes for each region, unevenness occurs in the reliability even within the same object.

Further, the reliability can be expressed by binary values. Specifically, the edge integration value calculated as described above is compared with a preset threshold. As a result, when the calculated edge integration value is greater than or equal to a preset threshold, it is determined that the pattern of the region varies much, and a high reliability (for example, 1) is allocated to the region. On the other hand, when the calculated edge integration value is less than the preset threshold, it is determined that the pattern of the region varies less, and a low reliability (for example, 0) is allocated to the region. With such a configuration, the defocus map and the reliability map are configured to have different resolutions from each other. That is, the defocus map and the reliability map are configured to have different gradations from each other. As discussed above, even with a configuration having different gradations, the same effect as that in the configuration having the same gradation can be obtained.

In such a way, with steps S401 and S402, a defocus map indicating image information and a reliability map indicating a reliability are acquired, respectively. While the dimension of the content to be represented is different from each other, both the maps become mutually correlated maps.

Next, at step S403, the filter processing unit 302 applies a filtering process to the defocus map and the reliability map, which are a pair of signals acquired at steps S401 and S402, respectively. In the present embodiment, a median filter is applied to the defocus map. In this case, in the present embodiment, a filtering process is applied to both the maps without impairing the correlation between the defocus map and the reliability map, which are a pair of signals, as described below.

In the filtering process, the coordinate position of a reference pixel that has finally been selected when a median filter is applied to the defocus map is pre-stored, and a reliability present at a coordinate position corresponding to the pre-stored coordinate position is output for the reliability map.

First, the filter processing unit 302 applies a median filter to the defocus map as a filtering process. The filter processing unit 302 rearranges pixel values of a target pixel and eight neighboring peripheral pixels thereof in a descending order or an ascending order by applying a median filter, refers to a reference pixel whose pixel value is a median, and selects and outputs that pixel value as a pixel value of the target pixel. Note that a pixel region to which a median filter is applied is not limited to a region of the three by three pixels including the target pixel and the eight neighboring peripheral pixels thereof, and may be a region of five by five pixels whose center is a target pixel, for example. In this case, the filter processing unit 302 stores, in the RAM 103 or the like, the coordinate position of the reference pixel by which the pixel value has finally been selected as a pixel value of the target pixel for each target pixel of the defocus map. With the filtering process by using a median filter, a robust defocus map with suppressed unevenness can be obtained.

Next, the filter processing unit 302 applies a filtering process to the reliability map corresponding to the defocus map to which a median filter has been applied. In the filtering process to the reliability map, the filter processing unit 302 refers to the coordinate position stored in the RAM 103 or the like in the filtering process for the defocus map. Thereby, the filter processing unit 302 determines a pixel value of a target pixel of the reliability map based on a pixel value of a reference pixel at a coordinate position corresponding to coordinate position of a reference pixel referenced in the determination of the pixel value of the corresponding target pixel of the defocus map. Specifically, as a reliability of the target pixel of the reliability map, the filter processing unit 302 determines and outputs the reliability of the reference pixel at the coordinate position corresponding to the coordinate position of the reference pixel by which the pixel value has been selected as a pixel value of the corresponding target pixel of the defocus map. While the corresponding coordinate positions are the same between both the maps, they may be different coordinate positions associated in accordance with a predetermined association relationship.

Specifically, description will be provided by using an example illustrated in FIG. 6B and FIG. 7B described above. First, application of a median filter causes a defocus amount value 101 of a reference pixel at $(m, n)=(1, 1)$ to be selected and output as a defocus amount value of a target pixel at $(m, n)=(0, 0)$. Also for the reliability map, the reliability value 255 of a reference pixel at $(m, n)=(1, 1)$ that is the corresponding same coordinate position is then output. In this way, with application of a filtering process to the reliability map, a filtering process can be applied to the defocus map and the reliability map without impairing the correlation between the defocus amount and the reliability.

As discussed above, according to the present embodiment, a filtering process can be applied to the defocus map and the reliability map, which are a pair of signals, to obtain a pair of signals having a high robustness without impairing mutual correlation.

Note that, while the case where the reliability of pixels in applying a median filter to a defocus map is not taken into consideration in particular has been described as an example in the present embodiment, the embodiment is not limited thereto. The filter processing unit 302 can also apply a median filter taking the reliability of a pixel into consideration as described below.

For example, when applying a median filter to the defocus map, it is possible to limit pixels to be referenced of the target pixel and the peripheral pixels thereof to reliable pixels. That is, when applying a median filter to the defocus map, pixels having a reliability value in the corresponding reliability map that is greater than or equal to a predetermined threshold may be referenced as a reference pixel out of the target pixel and the peripheral pixels thereof. The filter processing unit 302 can limit the reference pixels to be referenced in applying median filter to the defocus map to reliable pixels in such a way by referring to the reliability map.

Specifically, in the example of FIG. 7B described above for the reliability map, pixels whose reliability value is greater than or equal to the threshold 230 may be referenced out of the target pixel and the eight neighboring peripheral pixels. In this case, pixels at $(m, n)=(-1, 1), (0, -1), (-1, 0), (0, 0), (-1, 1), (0, 1),$ and $(1, 1)$ are the reference pixels to be referenced. FIG. 8A illustrates that the reference pixel is limited to the reliable pixels. In FIG. 8A, pixels without a diagonal pattern are reliable reference pixels. Note that FIG. 8A illustrates pixels of the reliability map together with pixel values indicating the reliability. FIG. 5B illustrates pixels of the defocus map corresponding to the pixels of the reliability map illustrated in FIG. 8A together with pixel values indicating the defocus amount.

When a median filter is applied to the defocus map, reliable pixels at $(m, n)=(-1, -1), (0, -1), (-1, 0), (0, 0), (-1,$ 1), (0, 1), and (1, 1) as described above are the reference pixels. A median filter is applied in the example of FIG. 5B regarding the defocus map by limiting the reference pixel in such a way. Then, the defocus amount value 101 of the pixel at (m, n)=(1, 1) is selected and output as a defocus amount value of the target pixel at (m, n)=(0, 0). In the filtering process to the reliability map, the reliability value 255 of the pixel at (m, n)=(1, 1), which is the same coordinate position, is then selected and output as a reliability value of the target pixel at (m, n)=(0, 0).

Further, as seen in the example of FIG. 8C for the reliability map, even when the reliability value of the target (m, n)=(0, 0) is less reliable below the threshold, pixels to be referenced by a median filter can be limited in a similar manner. Note that FIG. 8C illustrates pixels of the reliability map together with pixel values indicating the reliability. FIG. 8D illustrates pixels of the defocus map corresponding to the pixels of the reliability map illustrated in FIG. 8C together with pixel values indicating the defocus amount. Further, the pixels without a diagonal pattern are reference pixels having a high reliability. In this case, out of the target pixel and the eight neighboring peripheral pixels, pixels at (m, n) (−1, −1), (1, −1), (−1, 0), (1, 0), (−1, 1), (0, 1), and (1, 1) having a reliability value greater than or equal to the threshold 230 are the reference pixels. A median filter is applied in the example of FIG. 8D for the defocus map by limiting the reference pixel in such a way. In response, the defocus amount value 101 of the pixel at (m, n)=(1, 1) is selected and output as a defocus amount value of the target pixel at (m, n)=(0, 0). In the filtering process to the reliability map, the reliability value 255 of the pixel at (m, n)=(1, 1), which is the same coordinate position, is then output as a reliability value of the target pixel at (m, n)=(0, 0).

Furthermore, as illustrated in the example of FIG. 8E, the reliability may be less reliable below the threshold at all the pixels within a region including a target pixel and peripheral pixels thereof. Note that FIG. 8E illustrates the pixels of the reliability map together with pixel values indicating reliability. FIG. 8F illustrates pixels of the defocus map corresponding to the pixels of the reliability map illustrated in FIG. 8E together with pixel values indicating the defocus amount. All the pixels within the region are less reliable pixels with a diagonal pattern. In such a case, in both of the filtering processes to the defocus map and the reliability map, the pixel value of the target pixel can be output without change. When all the pixels within the region are less reliable in such a way, the value of the target pixel at (m, n)=(0, 0) is output without change in both of the filtering processes to the defocus map and to the reliable map.

Further, while the case of applying a median filter has been described in the present embodiment, the filter is not limited thereto. For example, it is possible to apply a joint bilateral filter disclosed in U.S. Pat. No. 7,889,949. Specifically, the processing result Jp of the joint bilateral filter at the target pixel position p is expressed by the following equation (7):

$$Jp=(1/Kp)\Sigma\Pi q \cdot f(|p-q|) \cdot g(|I2p-I2q|) \quad (7).$$

In equation (7), Σ denotes integration in a range q∈Ω, I1q denotes an input map pixel value at the peripheral pixel position q, f denotes a Gaussian function about the target pixel position p as the center, and g denotes a Gaussian function about the shaping image pixel value I2p at the target pixel position p as the center. Further, Ω denotes a region to be integrated about the target pixel position p as the center, Kp is a normalization factor and denotes an integration value with f·g weight. The smaller the difference between I2p at the target pixel position p and I2q at the peripheral pixel position q is, that is, the closer the pixel values of the target pixel and the peripheral pixel in the shaping image is, the larger the f·g weight (weight of smoothing) of the peripheral pixel will be.

When the shaping image is an RGB image and the joint bilateral filter expressed by equation (7) is applied to the defocus map and the reliability map, the coordinate positions of the pixels to be referenced can be the same. This allows for the same f·g weight (weight of smoothing), and it is therefore possible to apply a filtering process without impairing the mutual correlation.

Further, in the present embodiment, while the case where a defocus map is generated from the A image and the B image having a parallax has been described as an example, generation of a defocus map is not limited to the above. For example, a Depth From Defocus (DFD) method disclosed in Japanese Patent Application Laid-Open No. H01-167610 may be applied to the generation of a defocus map. Even in this case, unevenness may occur in a defocus map due to a pattern of an object, a change in a feeling of blur, variation in the S/N of a sensor pixel, or the like. Thus, even when a DFD method is applied, with application of the filtering process similar to that in the present invention described above, a defocus map and a reliability map having a high robustness can be obtained without impairing the mutual correlation.

Second Embodiment

An image processing apparatus and an image processing method according to the second embodiment of the present invention will be described by using FIG. 9 to FIG. 11. Note that, also in the present embodiment described below, a case where the image processing apparatus has an imaging unit, that is, a case where the image processing apparatus is an imaging apparatus such as a digital camera will be described as an example. Further, components similar to those in the image processing apparatus of the first embodiment described above are labeled with the same reference numerals, and the description thereof will be omitted or simplified.

In the present embodiment, an image processing apparatus that applies a filtering process to a distance map and a reliability map acquired by a Time Of Flight (TOF) scheme will be described.

Figure 9:
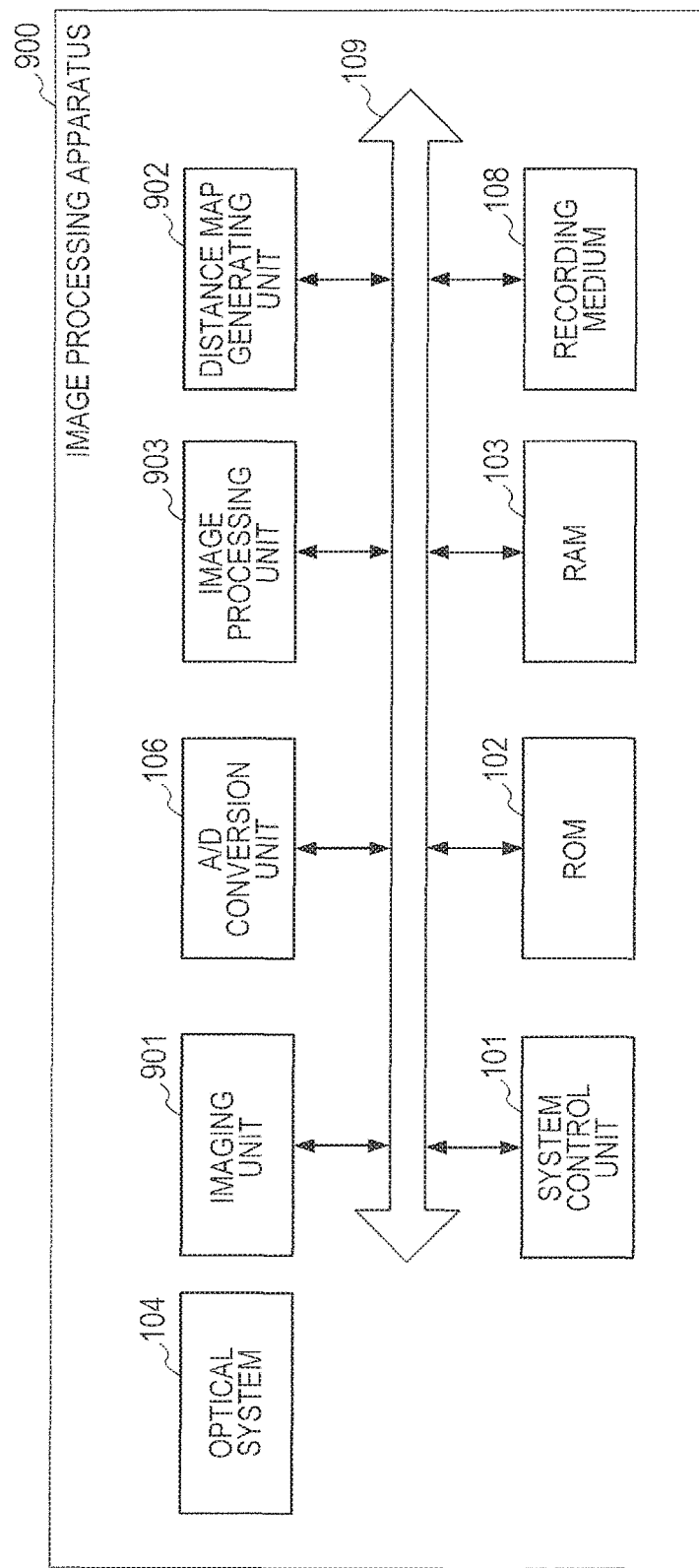
FIG. 9 is a block diagram illustrating a functional configuration of an image processing apparatus according to a second embodiment of the present invention.

FIG. 9 is a block diagram illustrating a functional configuration of the image processing apparatus according to the present embodiment. As illustrated in FIG. 9, the image processing apparatus 900 according to the present embodiment has the system control unit 101, the ROM 102, the RAM 103, the optical system 104, the A/D conversion unit 106, the recording medium 108, and the bus 109. Each of these units are the same as those in the first embodiment illustrated in FIG. 1. The image processing apparatus 900 according the present embodiment has an imaging unit 901, a distance map generating unit 902, and an image processing unit 903.

The imaging unit 901 is an imaging device such as a CCD image sensor, a CMOS image sensor, or the like, for example. Unlike the imaging unit 105 of the first embodiment, the imaging unit 901 is an imaging device configured such that a plurality of full-aperture pixels are aligned in a two-dimensional matrix, for example. Each of the full-aperture pixels configured such that one photoelectric conversion unit is provided to corresponding one of the micro lenses. The imaging unit 901 photoelectrically converts an optical image captured on the imaging device through optical system 104 to obtain an analog image signal. The imaging unit 901 outputs the obtained analog image signal to the A/D conversion unit 106.

The distance map generating unit 902 is a distance sensor module that generates information associated with a distance distribution of an object as a distance map by using a TOF scheme. The distance map generating unit 902 measures the distance to an object and acquires distance information on the object by using the TOF scheme, and generates a distance map indicating a spatial distribution of the acquired distance information. The distance map generating unit 902 outputs the acquired distance map to the RAM 103 as digital data and stores the acquired distance map therein. Note that the scheme for acquiring distance information by the distance map generating unit 902 is not limited to the TOF scheme, and a Depth From Defocus (DFD) scheme or a Depth From Focus (DFF) scheme may be used, for example, other than the TOF scheme.

The image processing unit 903 performs various image processing such as a process of white balance adjustment, color interpolation, scaling, or the like, in addition to generation of a reliability map, a filtering process, or the like in a similar manner to the image processing unit 107 of the first embodiment. The image processing unit 903 records image-processed images in the recording medium 108.

Figure 10:
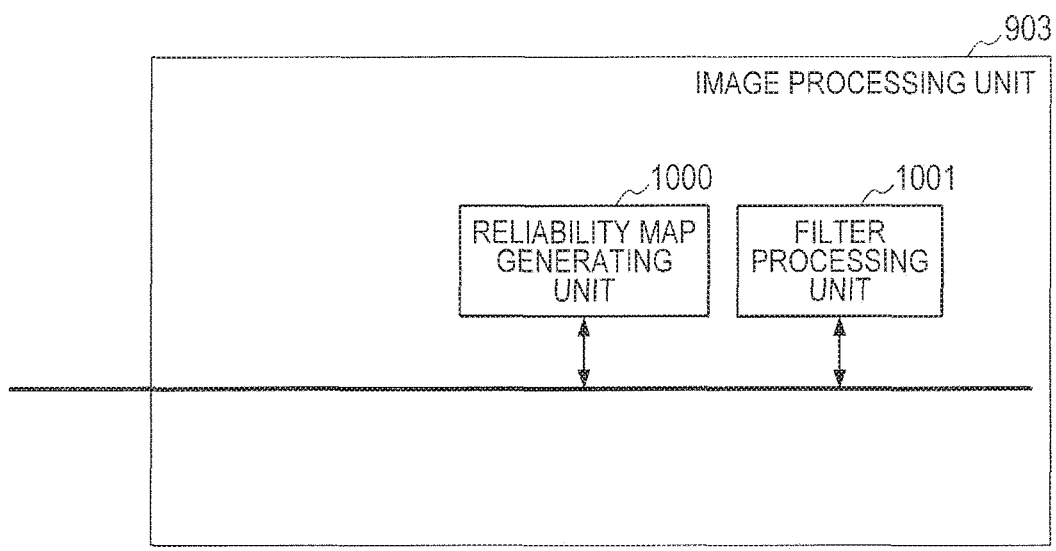
FIG. 10 is a block diagram illustrating a configuration of the image processing unit of the image processing apparatus according to the second embodiment of the present invention.
Figure 11:
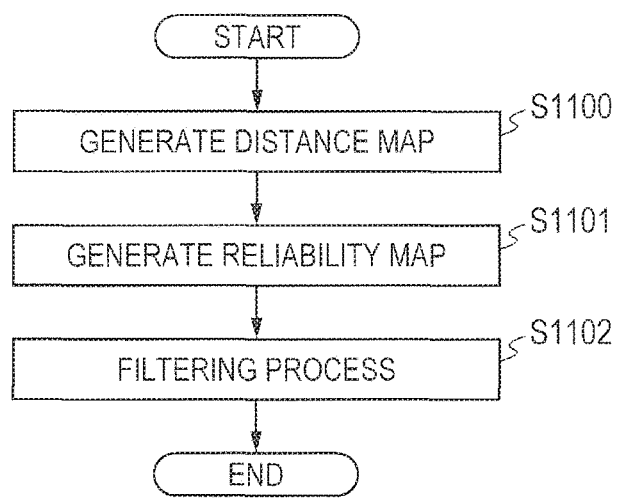
FIG. 11 is a flowchart illustrating operation of the image processing apparatus according to the second embodiment of the present invention.

FIG. 10 is a block diagram illustrating an example of a specific configuration of the image processing unit 903 in the image processing apparatus 900 according to the present embodiment. As illustrated in FIG. 10, the image processing unit 903 has a reliability map generating unit 1000 and a filter processing unit 1001.

The reliability map generating unit 1000 derives a reliability that is one of the evaluation values for the distance information acquired by the distance map generating unit 902 and generates a reliability map indicating a spatial distribution of the derived reliability. While a distance map is an image signal indicating image information, a reliability map is an evaluation value signal indicating evaluation information on the distance map. The reliability map has the same resolution as the distance map, that is, the same gradation as the distance map. Note that the reliability map may have a different resolution from the distance map, that is, a different gradation from the distance map. While the distance map and the reliability map are different from each other in the dimension of what they indicate, these maps have a correlation with each other. Therefore, a distance map, which is an image signal, and a reliability map, which is an evaluation value signal, form a pair of signals having a correlation with each other. In the present specification, both the maps are collectively referred to as "a pair of signals".

The distance map generating unit 902 and the reliable map generating unit 1000 described above function as an acquisition unit adapted to generate and acquire a distance map and a reliability map as a pair of signals.

The filter processing unit 1001 functions as a filter processing unit adapted to apply a filtering process to a distance map and a reliability map, which are a pair of signals. That is, the filter processing unit 1001 applies a filtering process using a median filter to the distance map. On the other hand, the filter processing unit 1001 applies, to the reliability map, a filtering process for determining a pixel value of a target pixel by referring to a pixel at the same coordinate position as a reference pixel that has been referenced in the determination of the pixel value of the target pixel in the filtering process for the distance map.

Operation of the image processing apparatus 900 including processes performed by the image processing unit 903 will be described below by using FIG. 11. FIG. 11 is a flowchart illustrating the operation of the image processing apparatus 900 including processes performed by the image processing unit 903.

First, at step S1100, the distance map generating unit 902 generates a distance map of the TOF scheme for an object.

Next, at step S1101, the reliability map generating unit 1000 generates a reliability map for the distance map of the TOF scheme generated by the distance map generating unit 902. While the method of generating a reliability map for a distance map is not limited in particular, a method disclosed in Japanese Patent Application Laid-Open No. 2016-17799 can be used, for example. In this method, the level of reliability is determined by comparing a variation degree of the distance among a plurality of frames of the distance map with a threshold on a pixel unit basis. That is, a variation degree is compared with a certain predefined level, the reliability is determined to be relatively high when the variation degree is less than the certain level, and the reliability is determined to be relatively low when the variation degree is greater than or equal to the certain level. The reliability can be expressed by binary values. Note that the reliability value may be higher for a lower variation degree and be lower for a higher variation degree. The reliability of distance information indicated in a pixel at the corresponding coordinate position in a distance map is indicated in each pixel of a reliability map. Specifically, while both the corresponding coordinate positions are the same, they may be different coordinate positions associated in accordance with a predetermined association relationship.

Next, at step S1102, the filter processing unit 1001 applies a filtering process to the distance map and the reliability map, which are a pair of signals acquired at steps S1100 and S1101, respectively, in a similar manner to step S403 of the first embodiment.

First, the filter processing unit 1001 applies a median filter to the distance map as a filtering process in a similar manner to the filtering process for the defocus map in the first embodiment. In this operation, the filter processing unit 1001 stores, in the RAM 103 or the like, the coordinate position of the reference pixel by which a pixel value has finally been selected as a pixel value of a target pixel for each target pixel of the distance map. With a filtering process using a median filter, a robust distance map with a reduced variation of distance can be obtained.

Next, the filter processing unit 1001 applies a filtering process to the reliability map corresponding to the distance map to which a median filter has been applied. In the filtering process for the reliability map, the filter processing unit 1001 refers to the coordinate positions stored in the RAM 103 or the like in the filtering process for the distance map. Thereby, the filter processing unit 1001 determines a pixel value of a target pixel of the reliability map based on a pixel value of a reference pixel at a coordinate position corresponding to a coordinate position of a reference pixel referenced in the determination of the pixel value of the corresponding target pixel of the distance map. Specifically, as a reliability of the target pixel of the reliability map, the filter processing unit 1001 determines and outputs the reliability of the reference pixel at the coordinate position corresponding to the coordinate position of the reference pixel by which the pixel value has been selected as a pixel value of the corresponding target pixel of the distance map. While both the corresponding coordinate positions are the same, they may be different coordinate positions associated in accordance with a predetermined association relationship. In such a way, a reliability map in which the correlation with a distance map is not impaired can be obtained.

As discussed above, according to the present embodiment, applied a filtering process can be to a distance map and a reliability map, which are a pair of signals acquired by using TOF scheme, without impairing the mutual correlation, and thus a pair of signals having a high robustness can be obtained.

Note that, while the case where the reliability of pixels in applying a median filter to a distance map is not taken into consideration in particular has been described as an example in the present embodiment, the embodiment is not limited thereto. In a similar manner to the first embodiment, one or more pixels whose reliability value in the corresponding reliability map is greater than or equal to a predetermined threshold may be referenced as one or more reference pixels out of a target pixel and peripheral pixels thereof when a median filter is applied to a distance map also in the present embodiment.

Further, when all the pixels within a region including a target pixel and peripheral pies thereof are have a reliability below a threshold and thus less reliable, the pixel value of the target pixel can be output without change in both the filtering processes to the distance map and the reliability map in a similar manner to the first embodiment.

Further, while the case of applying a median filter has been described as an example in the present embodiment, the filter is not limited thereto, and a joint bilateral filter can be applied in a similar manner to the first embodiment.

Third Embodiment

An image processing apparatus and an image processing method according to the third embodiment of the present invention will be described by using FIG. 12 to FIG. 15B. Note that, also in the present embodiment described below, a case where the image processing apparatus has an imaging unit, that is, a case where the image processing apparatus is an imaging apparatus such as a digital camera or the like will be described as an example. Further, components similar to those in the image processing apparatus of the first embodiment described above are labeled with the same reference numerals, and the description thereof will be omitted or simplified.

In the present embodiment, an image processing apparatus that applies a filtering process to a defocus map and a region extraction map will be described. The region extraction map is resulted by utilizing a plurality of feature quantities to extract an object region.

Figure 12:
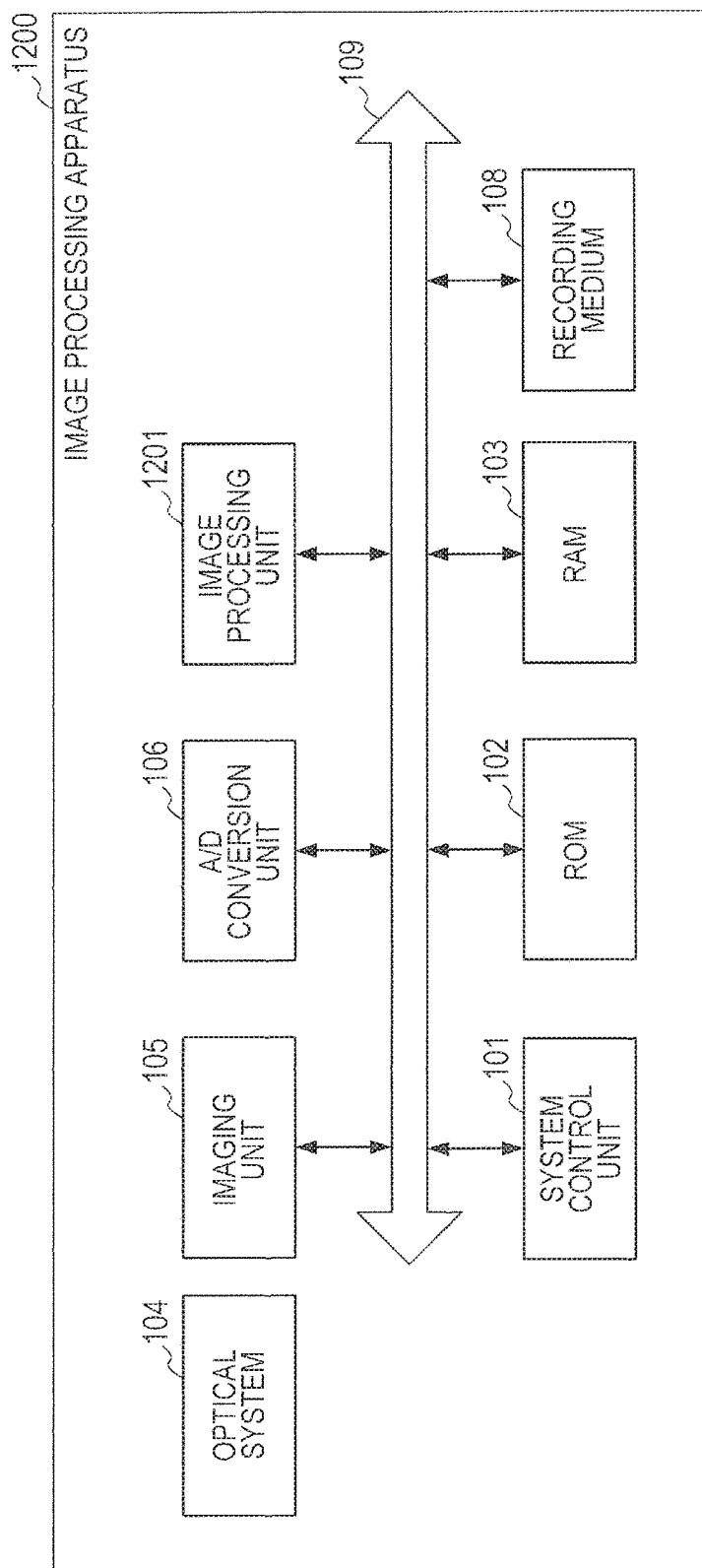
FIG. 12 is a block diagram illustrating a functional configuration of an image processing apparatus according to a third embodiment of the present invention.

FIG. 12 is a block diagram illustrating a functional configuration of the image processing apparatus according to the present embodiment. As illustrated in FIG. 12, the image processing apparatus 1200 has the system control unit 101, the ROM 102, the RAM 103, the optical system 104, the imaging unit 105, the A/D conversion unit 106, the recording medium 108, and the bus 109. Each of these units is the same as that in the first embodiment illustrated in FIG. 1. The image processing apparatus 1200 according to the present embodiment has an image processing unit 1201.

The image processing unit 1201 performs various image processing such as generation of a defocus map, generation of a region extraction map, a filtering process, or the like, for example, in addition to a process of white balance adjustment, color interpolation, scaling, or the like, in a similar manner to the image processing unit 107 of the first embodiment. The image processing unit 1201 records image-processed images in the recording medium 108.

Figure 13:
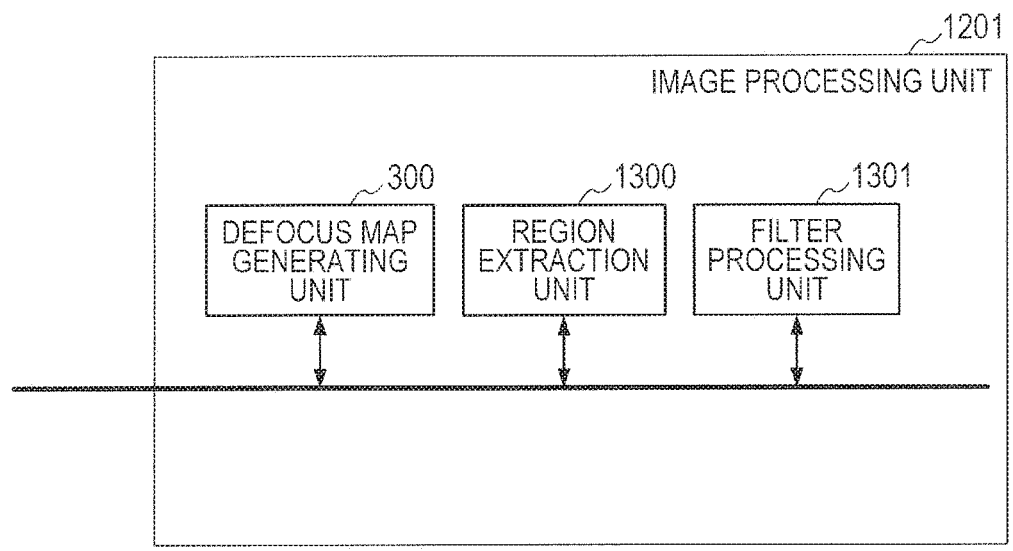
FIG. 13 is a block diagram illustrating a configuration of the image processing unit of the image processing apparatus according to the third embodiment of the present invention.

FIG. 13 is a block diagram illustrating an example of a specific configuration of the image processing unit 1201 in the image processing apparatus 1200 according to the present embodiment. As illustrated in FIG. 13, the image processing unit 1201 has the defocus map generating unit 300, a region extraction unit 1300, and a filter processing unit 1301. The defocus map generating unit 300 is the same as that in the first embodiment illustrated in FIG. 3.

The region extraction unit 1300 utilizes a plurality of feature quantities to extract a region such as an object region, a background region, or the like from an image and generate a region extraction map. An image from which the region extraction unit 1300 extracts a region is a full-aperture image, which is an image obtained by adding the A image and the B image that are referenced when generating a defocus map. The image processing unit 1201 acquires the A image and the B image to generate a full-aperture image as a pre-process before the process performed by the region extraction unit 1300. Note that the technology for extracting a region such as an object region from an image is known and disclosed in Japanese Patent Application Laid-Open No. 2006-39666, for example. The region extraction unit 1300 can use a known technology to extract a region from a full-aperture image.

The defocus map indicates a defocus amount for the corresponding region extraction map, and is an evaluation value signal for the region extraction map which is an image signal. The region extraction map has the same resolution as the defocus map, that is, the same gradation as the defocus map. Note that the region extraction map may have a different resolution from the defocus map, that is, a different gradation from the defocus map. While the defocus map and the region extraction map are different from each other in the dimension of what they indicate, these maps have a correlation with each other. Therefore, a region extraction map, which is an image signal, and a defocus map, which is an evaluation value signal, form a pair of signals having a correlation with each other. In the present specification, both the maps are collectively referred to as "a pair of signals".

The region extraction unit 1300 and the defocus map generating unit 300 function as an acquisition unit adapted to generate and acquire a region extraction map and a defocus map as a pair of signals.

The filter processing unit 1301 functions as a filter processing unit adapted to apply a filtering process to a region extraction map and a defocus map that are a pair of signals. That is, the filter processing unit 1301 applies a filtering process using a median filter to the region extraction map. On the other hand, the filter processing unit 1301 applies, to the defocus map, a filtering process for determining a pixel value of a target pixel by referring to a pixel at the same coordinate position as a reference pixel that has been referred to in the determination of the pixel value of the target pixel in the filtering process for the region extraction map.

Figure 14:
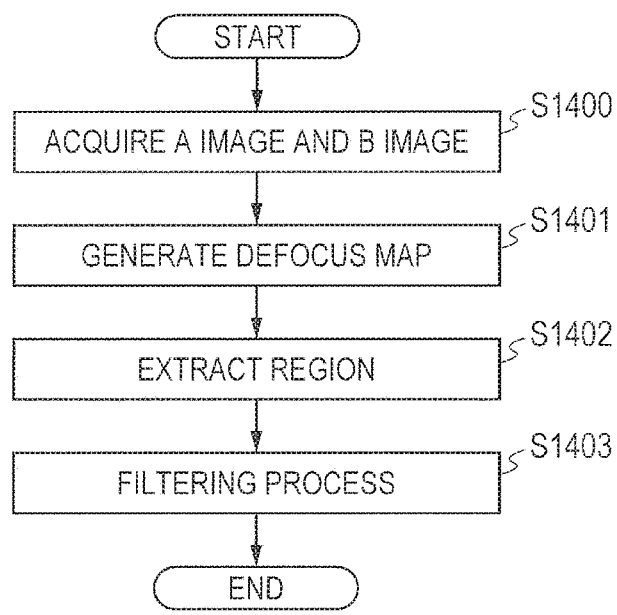
FIG. 14 is a flowchart illustrating operation of the image processing apparatus according to the third embodiment of the present invention.

Operation of the image processing apparatus 1200 including processes performed by the image processing unit 1201 will be described below by using FIG. 14. FIG. 14 is a flowchart illustrating the operation of the image processing apparatus 1200 including processes performed by the image processing unit 1201.

First, at step S1400, the image processing apparatus 1200 as an imaging apparatus captures an object in a similar manner to step S400 of the first embodiment. Thereby, the image processing unit 1201 acquires an A image and a B image that are a pair of parallax images. Note that an A image and a B image may be prerecorded in the storage medium 108, and the image processing unit 1201 may read out and acquire the prerecorded A image and B image.

Next, at step S1401, the defocus map generating unit 300 generates a defocus map indicating a spatial distribution of a defocus amount as information associated with the distance distribution of the object in a similar manner to step S401 of the first embodiment.

Next, at step S1402, the region extraction unit 1300 extracts a region such as an object region, a background region, or the like by utilizing a plurality of feature quantities from a full-aperture image that is obtained by adding the A image and the B image referenced when the defocus map generating unit 300 generates a defocus map. Thereby, the region extraction unit 1300 generates a region extraction map.

FIG. 15A and FIG. 15B illustrate an example of a result of region extraction performed by the region extraction unit 1300. FIG. 15A illustrate an example of a region extraction map. The region extraction map illustrated in FIG. 15A represents feature quantities by gray scale values to indicate a result of region extraction. In this region extraction map, a human region 1500 that is a region in which a person is captured is represented by a value of 255, a sky region 1501 in which background sky is captured is represented by a value of 0, and a building region 1502 in which a background building is captured is represented by a value of 128. In the present embodiment, representation of the feature quantity with gray scale values in such a way is called labeling, and the region extraction map illustrated in FIG. 15A may also be called labeling image. Further, because the person captured in the human region 1500 wore clothes with color similar to the sky, there is a pixel determined as a sky region within the human region 1500. This results in uneven region extraction. FIG. 15B extracts and illustrates a result of region extraction of a target pixel 1503 and eight neighboring peripheral pixels thereof within the human region 1500 with gray scale values. Such a region extraction result is output as a region extraction map.

Next, at step S1403, the filter processing unit 1301 applies a filtering process in a similar manner to step S403 of the first embodiment to the defocus map and the region extraction map, which are a pair of signals acquired by steps S1401 and S1402, respectively. In the present embodiment, however, a median filter is applied to the region extraction map.

First, the filter processing unit 1301 applies a median filter to the region extraction map as a filtering process in a similar manner to the filtering process to the defocus map in the first embodiment. In this operation, for respective target pixels of the region extraction map, the filter processing unit 1301 stores, in the RAM 103 or the like, the coordinate positions of reference pixels by which pixel values have finally been selected as pixel values of the target pixels. With the filtering process using a median filter, a robust region extraction map with reduced unevenness can be obtained. In the example illustrated in FIG. 15B, for the target pixel that has been determined as sky, a determination result to be a person is referenced and output after the filtering process. Here, when pixel values referenced by the median filter are the same, a pixel order of (m, n)=(−1, −1), (0, −1), (1, −1), (−1, 0), (0, 0), (1, 0) (−1, 1), (0, 1), and (1, 1) is employed. The pixel value of a pixel located at the center is then output as a pixel value of the target pixel. Note that an output scheme when the reference pixels have the same value is not limited to the above.

Next, the filter processing unit 1301 applies a filtering process to a defocus map corresponding to the region extraction map to which a median filter is applied. In the filtering process to the defocus map, the filter processing unit 1301 refers to the coordinate position stored in the RAM 103 or the like in the filtering process applied to the region extraction map. Thereby, the filter processing unit 1301 determines a pixel value of a target pixel of the defocus map based on the pixel value of the reference pixel at the coordinate position corresponding to the coordinate position of the reference pixel referenced in the determination of a pixel value of the corresponding target pixel of the region extraction map. Specifically, as the defocus amount of the target pixel of the defocus map, the filter processing unit 1301 determines and outputs a defocus amount of the reference pixel at the coordinate position corresponding to the coordinate position of the reference pixel by which the pixel value has been selected as the pixel value of the corresponding target pixel of the region extraction map. While both the corresponding coordinate positions are the same, they may be different coordinate positions associated in accordance with a predetermined association relationship. In such a way, a defocus map in which the correlation with the region extraction map is not impaired can be obtained.

As discussed above, according to the present embodiment, a filtering process can be applied to the region extraction map and the defocus map, which are a pair of signals, without impairing the mutual correlation, and a pair of signals having a high robustness can be obtained.

Note that, while the case where a median filter is applied to the region extraction map has been described above as an example, a median filter may be applied to the defocus map in a similar manner to the first embodiment. The region extraction map indicates attribute information regarding the corresponding defocus map and is an evaluation value signal regarding the defocus map, which is an image signal. A case where a median filter is applied to the defocus map will be described below.

First, the filter processing unit 1301 applies a median filter to the defocus map as a filtering process in a similar manner to the first embodiment. In this operation, for respective target pixels of the defocus map, the filter processing unit 1301 stores, in the RAM 103 or the like, the coordinate positions of reference pixels by which pixel values have finally been selected as pixel values of the target pixels. With the filtering process using a median filter, a robust defocus map with reduced unevenness can be obtained.

Next, the filter processing unit 1301 applies a filtering process to a region extraction map corresponding to the defocus map to which a median filter is applied. In the filtering process to the region extraction map, the filter processing unit 1301 refers to the coordinate position stored in the RAM 103 or the like in the filtering process applied to the defocus map. Thereby, the filter processing unit 1301 determines a pixel value of a target pixel of the region extraction map based on the pixel value of the reference pixel at the coordinate position corresponding to the coordinate position of the reference pixel referenced in the determination of a pixel value of the corresponding target pixel of the defocus map. Specifically, as the feature quantity of the target pixel of the region extraction map, the filter processing unit 1301 determines and outputs a feature quantity of the reference pixel at the coordinate position corresponding to the coordinate position of the reference pixel by which the pixel value has been selected as the pixel value of the corresponding target pixel of the defocus map. While both the corresponding coordinate positions are typically the same, they may be different coordinate positions associated in accordance with a predetermined association relationship. In such a way, a region extraction map in which the correlation with the defocus map is not impaired can be obtained.

Further, while the case where a median filter is applied has been described as an example in the present embodiment, the filter is not limited thereto, and a joint bilateral filter may be applied in a similar manner to the first embodiment.

Further, while the case where a defocus map is generated from the A image and the B image having a parallax has been described as an example in the present embodiment, generation of the defocus map is not limited to the above, and other methods can be applied to generation of a defocus map in a similar manner to the first embodiment.

Further, while the case where a defocus map is acquired in the configuration of the first embodiment has been described as an example in the present embodiment, the distance map may be acquired in the configuration of the second embodiment.

Modified Embodiments

Although preferred embodiments of the present invention has been described above, the present invention is not limited to these embodiments, and various modifications and variations are possible within its spirit.

For example, while the cases where the image processing apparatuses 100, 900, and 1200 each are an imaging apparatus have been described as an example in the above embodiments, the invention is not limited thereto. The image processing apparatuses 100, 900, and 1200 may be any apparatus as long as it can apply a filtering process to a pair of signals, and may not have the optical system 104, the imaging unit 105, or the A/D conversion unit 106. In this case, a filtering process can be applied to a pair of signals input from the outside, for example, as illustrated in the embodiments described above.

Further, while the case of applying a median filter or a joint bilateral filter as a nonlinear spatial filter has been described as an example in the above embodiments, the filter is not limited thereto. The present invention can be applied to cases of applying various nonlinear spatial filters.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-150265, filed Jul. 29, 2016, which is hereby incorporated by reference herein in its entirety.

What is claimed is:

1. An image processing apparatus comprising:
a memory comprising instructions; and
a processor configured to execute the instructions to:
acquire a first map which represents a distribution of signal values and a second map which represents a distribution of evaluation values corresponding to the first map as a pair; and
apply a first filtering process to the first map and apply a second filtering process to the second map,
wherein the processor is further configured to execute the instructions to:
in the first filtering process, determine a signal value of a first target signal based on a first reference signal value in the first map, and
in the second filtering process, according to the first filtering process, determine an evaluation value of a second target evaluation value corresponding to the first target signal using an evaluation value of a second reference evaluation value at a coordinate position corresponding to a coordinate position of the first reference signal.

2. The image processing apparatus according to claim 1, wherein the processor is further configured to execute the instructions to:
in the second filtering process, determine the evaluation value of the second target evaluation value based on the evaluation value of the second reference evaluation value at the same coordinate position as the coordinate position of the first reference signal.

3. The image processing apparatus according to claim 1, wherein the first map is a defocus map representing a spatial distribution of a defocus amount.

4. The image processing apparatus according to claim 1, wherein the first map is a distance map obtained by a Time Of Flight scheme.

5. The image processing apparatus according to claim 1, wherein the second map is a reliability map representing a reliability of the first map.

6. The image processing apparatus according to claim 5, wherein, in the reliability map, the reliability is determined based on edge information for each region.

7. The image processing apparatus according to claim 1, wherein the second map is an image signal captured from an image sensor.

8. The image processing apparatus according to claim 1, wherein the processor is further configured to execute the instructions to:
apply a median filter to the first map in the first filtering process.

9. The image processing apparatus according to claim 1, wherein the processor is further configured to execute the instructions to:

apply a bilateral filter to the first map in the first filtering process.

10. The image processing apparatus according to claim 1, wherein the processor is further configured to execute instructions to:
apply the first filtering process based on a first reference signal whose evaluation value in the second map is greater than or equal to a threshold.

11. The image processing apparatus according to claim 1, wherein the processor is further configured to execute the instructions to:
output a signal value of the first target signal as a result of the first filtering process when evaluation values of the first target signal and peripheral signal of the first target signal are below a threshold.

12. The image processing apparatus according to claim 1, wherein the first map and the second map are different in gradation from each other.

13. An image processing method comprising steps of:
acquiring a first map which represents a distribution of signal values and a second map which represents a distribution of evaluation values corresponding to the first map as a pair, and
applying a first filtering process to the first map and applying a second filtering process to the second map,
in the first filtering process, the step of applying the first filtering process determines a signal value of a first target signal based on a first reference signal value in the first map, and
in the second filtering process, according to the first filtering process, the step of applying the second filtering process determines an evaluation value of a second target evaluation value corresponding to the first target signal using an evaluation value of a second reference evaluation value at a coordinate position corresponding to a coordinate position of the first reference signal.

14. A non-transitory computer readable storage medium storing a program that causes a computer to execute steps of:
acquiring a first map which represents a distribution of signal values and a second map which represents a distribution of evaluation values corresponding to the first map as a pair, and
applying a first filtering process to the first map and applying a second filtering process to the second map,
in the first filtering process, the step of applying the first filtering process determines a signal value of a first target signal based on a first reference signal value in the first map, and
in the second filtering process, according to the first filtering process, the step of applying the second filtering process determines an evaluation value of a second target evaluation value corresponding to the first target signal using an evaluation value of a second reference evaluation value at a coordinate position corresponding to a coordinate position of the first reference pixel.

* * * * *